April 18, 1961 B. N. WALLIS 2,980,366
VARIABLE SWEEPBACK AIRPLANE
Filed Dec. 17, 1959 2 Sheets-Sheet 2
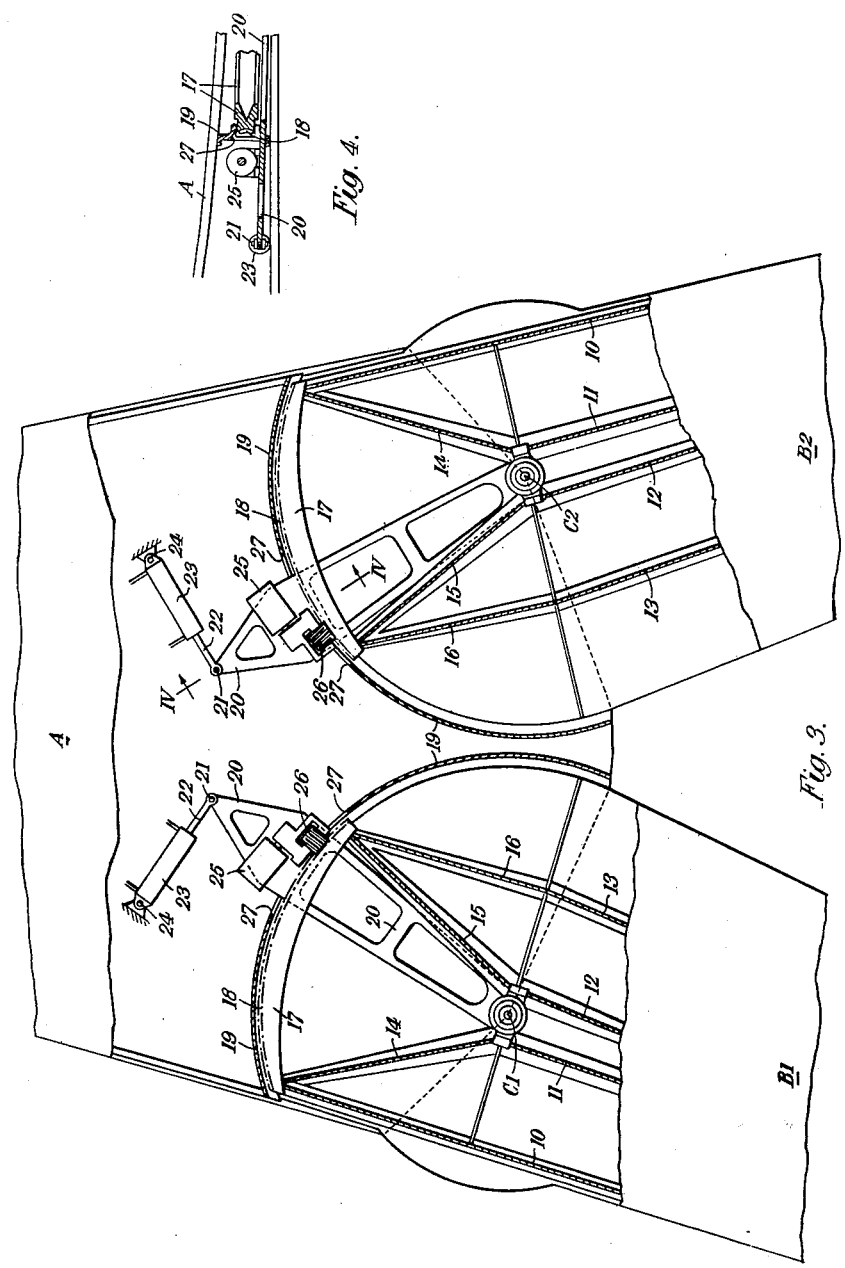
INVENTOR
BARNES N. WALLIS

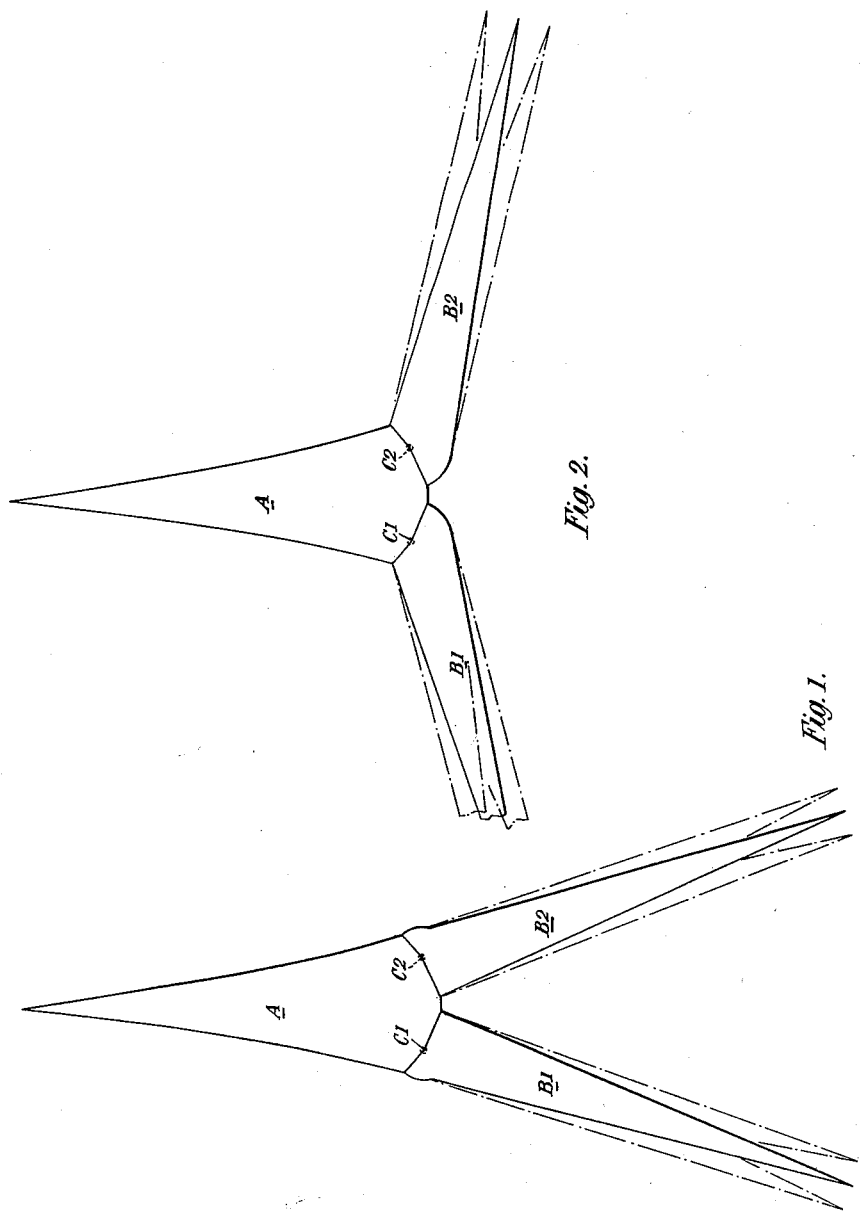

United States Patent Office 2,980,366
Patented Apr. 18, 1961

2,980,366

VARIABLE SWEEPBACK AIRPLANE

Barnes N. Wallis, Effingham, England, assignor to Vickers-Armstrongs (Aircraft) Limited, London, England Filed Dec. 17, 1959, Ser. No. 860,288

2 Claims. (Cl. 244—46)

This invention is concerned with means of control of the aerodyne which forms the subject of our U.S. patent application No. 482,249 of 1955, now Patent No. 2,915,261, which comprises a delta-shaped fore-wing having mounted at the extremities of its base main-wings capable of pivotal movement between an outspread position for landing and take-off, and a swept-aft position appropriate to flight at supersonic speeds. It was contemplated that manoeuvre control of such an aerodyne might be achieved through the medium of eleven flaps on the trailing edges of the main-wings, but although such an arrangement would be satisfactory for flight at subsonic speeds when the wings are in the outspread position, experience shows that flaps on swept-back wings cannot be used for control at supersonic speeds, and are only useful as trimmers for correcting the variations in pitching moment with alteration of incidence which are characteristic of delta-shaped aircraft. The object of this invention is to provide alternative means of controlling said aerodyne at all speeds.

The invention takes advantage of the pivotal mounting of the main-wings, and it is accordingly proposed that speed control shall be effected solely by angular adjustment of the main-wings in sweep, and to provide supplementary means operable independently of the main-wing sweep adjustment means for moving the main-wings alternatively in the same direction and to the same extent for control in pitch, or diferentially for control in roll.

Such latter control movements, being for manoeuvre, need only be of small amplitude, but they will require to be executed with great rapidity. For this purpose the invention provides quick-acting mechanism which is auxiliary to that employed for the relatively slow main-wing rotation which is required for changes in speed. That is to say, the manoeuvre-control mechanism may be so arranged as to effect a low-amplitude angular adjustment in either direction in relation to any datum main-wing position selected by the low-speed sweep-adjusting apparatus.

One embodiment of the invention is hereinafter described with reference to the accompanying drawings, in which Figs. 1 and 2 are plan views of the aerodyne which is the subject of U.S. Patent No. 2,915,261, as modified by the invention claimed in U.S. patent application No. 581,886 of 1956, now abandoned, respectively showing the main-wings in the supersonic and subsonic positions.

Fig. 3 is a fragmentary plan view, drawn to a larger scale, of the main wing actuating mechanism, and Fig. 4 is a section on the line IV—IV of Fig. 3.

In said drawings, the reference letter A denotes the fore-wing, and the letters $B_1$, $B_2$ the main-wings which are respectively pivoted to the fore-wing A at $C_1$ and $C_2$. During take-off and landing operations, and when flying at subsonic speeds, the main-wings $B_1$, $B_2$ occupy the position indicated in Fig. 2. During flight at supersonic speeds they assume the position shown in Fig. 1.

The main-wing structure, which includes the spars 10, 11, 12, and 13 and sub-spars 14, 15 and 16 forms a root extension terminating inboard of the pivot $C_1$ (or $C_2$) in an arcuate member 17, which is provided on its outer face with a worm-wheel segment 18, and which is arranged to move during the rotary motion of the main-wing within a concentric housing 19 which is incorporated in the structure of the fore-wing A.

Mounted for pivotal movement about the axis of the main-wing pivot $C_1$ or $C_2$) is a lever 20 connected at 21 to the end of the ram 22 of a hydraulic jack, the cylinder 23 of which is pivotally mounted at 24 upon the basal structure of the fore-wing. Said lever 20 carries a motor 25, arranged to drive a worm 26 which is in mesh with said worm-wheel segment 18 fixed to the main-wing member 17, and the arrangement is such that the simultaneous operation of the motors 25 relating to both main-wings $B_1$, $B_2$ serves to effect the relatively slow rotation of the main-wings between the positions illustrated in Figs. 1 and 2, as required for speed control.

The relatively fast small-amplitude adjustments of the main-wings required for manoeuvre control are effected by operating the jacks 22, 23, the reciprocating motions of which are communicated to the wings by the levers 20 due to the meshing engagement of the speed-control worm gearing 26, 18. Such main-wing movements are indicated by dotted lines in Figs. 1 and 2. The radial movement of the levers 20 is accommodated by slots 27 in the housings 19. The jacks 22, 23 are operated in the same sense for control in pitch, and differentially for control in roll.

What I claim as my invention and desire to secure by Letters Patent is:

1. An aircraft comprising a fore-wing structure, a pair of main-wings, each of said main wings being connected to said structure by a pivot, said main wings being adjustable about said pivots for varying the sweepback, means for effecting relatively slow large-amplitude adjustments of the main-wings in sweep for the purpose of speed control, supplementary means, operable indepently of the speed control means, for performing relatively fast small-amplitude pivotal movements of the main-wings alternatively in the same sense and to the same extent for control in pitch, or differentially for control in roll.

2. Apparatus as claimed in claim 1, wherein each main-wing has a root extension inboard of the pivot, and comprising in respect of each main-wing a lever pivotable about the axis of said pivot and connected to the reciprocatory element of a jack carried by the fore-wing structure, a gear segment on said root extension, said lever carrying a motor having a gear meshing with said segment, and the arrangement being such that slow large-amplitude rotary movements of the main-wings are affected by said motor, whilst the jacks are operable together or differentially to effect fast small-amplitude adjustments as required for pitch and roll control, the movements of the jacks being transmitted to the main-wings through the connections provided between the latter and the pivotal levers by the motor gearing.

References Cited in the file of this patent

UNITED STATES PATENTS 2,741,444     Baynes _____ Apr. 10, 1956

FOREIGN PATENTS 756,019     Great Britain _____ Aug. 29, 1956